United States Patent [19]

Gazeley

[11] Patent Number: 4,890,910
[45] Date of Patent: Jan. 2, 1990

[54] OPTICAL ACCESSORY FOR SPECTACLES

[75] Inventor: Albert E. Gazeley, Hong Kong, Hong Kong

[73] Assignee: Polaroid Corporation, Cambridge, Mass.

[21] Appl. No.: 777,640

[22] Filed: Sep. 19, 1985

[51] Int. Cl.$^4$ .............................................. G02C 9/00
[52] U.S. Cl. .......................................... 351/47; 351/57
[58] Field of Search ............................ 351/47, 57, 58

[56] References Cited

U.S. PATENT DOCUMENTS

| | | | |
|---|---|---|---|
| D. 197,305 | 1/1964 | Magnuson et al. | D57/1 |
| 716,194 | 12/1902 | Conn. | |
| 1,348,713 | 8/1920 | Gitterman. | |
| 2,159,710 | 5/1939 | Reichert | 88/41 |
| 2,580,859 | 1/1952 | Steckler | 88/41 |
| 2,602,372 | 7/1952 | Passet | 88/41 |
| 2,607,919 | 8/1952 | Stegeman | 2/14 |
| 2,696,141 | 12/1954 | Hurst | 88/43 |
| 2,842,029 | 7/1958 | Roth | 351/57 |
| 2,949,609 | 8/1960 | Sager | 2/13 |
| 2,976,767 | 3/1961 | McNeill | 88/41 |
| 2,981,956 | 5/1961 | Thompson | 2/13 |
| 3,092,838 | 6/1963 | Vacha | 2/12 |
| 3,238,005 | 3/1966 | Petitto | 351/59 |
| 3,345,121 | 10/1967 | DeAngelis | 351/130 |
| 3,453,042 | 7/1969 | Cooper | 351/47 |
| 3,555,563 | 1/1971 | Grossman | 2/14 |
| 3,604,013 | 9/1971 | Hammond | 2/13 |
| 3,741,634 | 6/1973 | Stolize | 351/57 |
| 3,890,037 | 6/1975 | Zingarelli | 351/47 |
| 3,944,346 | 3/1976 | Shindler | 351/49 |
| 3,958,867 | 5/1976 | Morgan | 351/47 |
| 3,981,569 | 9/1976 | Morgan | 351/47 |
| 4,012,129 | 3/1977 | Byler | 351/46 |
| 4,176,921 | 12/1979 | Matthias | 351/106 |
| 4,217,037 | 8/1980 | Lemelson | 351/44 |
| 4,253,745 | 3/1981 | Bizzarri | 351/45 |
| 4,322,138 | 3/1982 | St. Minart | 351/155 |
| 4,338,004 | 7/1982 | Vesper | 351/47 |
| 4,402,577 | 9/1983 | Minart | 351/125 |
| 4,402,578 | 9/1983 | Minart | 351/140 |
| 4,405,214 | 9/1983 | Bolle | 351/88 |
| 4,504,127 | 3/1985 | Cottet | 351/86 |

OTHER PUBLICATIONS

Optical Journal and Review of Optometry, vol. XC1, No. 7, Apr. 1, 1954, p. 55.
World Patent Abstracts, Dec. 5, 1984, Optics Photography Week 8442-see p. 4, P81-Week 8443-see p. 3, P81.

Primary Examiner—P. M. Dzierzynski
Attorney, Agent, or Firm—Edward S. Roman; Leslie J. Payne

[57] ABSTRACT

The present disclosure is directed to optical accessories of the sunshade type which releasably cooperate with a frame of prescription glasses. The accessory has a pair of rearwardly projecting flexibly resilient prongs which when seated in respective grooves formed in inwardly facing portions of the frame to effect a snap-fit engagement of the accessory to the glasses.

5 Claims, 2 Drawing Sheets

OPTICAL ACCESSORY FOR SPECTACLES

BACKGROUND OF THE INVENTION

The present invention relates generally to optical accessories for use with spectacles and, more particularly, releasable accessories for such spectacles.

Optical accessories for use in combination with spectacles exist for a wide variety of reasons. Sunglass accessories, for instance, generally permit optimum use of the spectacles under varying lighting conditions. Other optical accessories provide, for example, eye shielding and vision correcting functions.

A number of factors are considered important in constructing such accessories. In this regard, it is desirable to have the optical elements of the accessory positioned in correct superposed relationship to the optical members of the spectacles for proper usage and convenience. Also for sake of convenience, it is highly desirable to avoid unnecessary movement of the accessory. Moreover, facilitating quick, easy and reliable mounting and demounting of the accessory are of practical importance. Significantly, it is desirable to have these mounting arrangements as aesthetic as possible. Unaesthetic mounting arrangements, of course, detract appreciably from the commercial appeal of such accessories. Furthermore, in the highly competitive spectacle accessory field need exists to provide the foregoing features as simply, economically and efficiently as possible.

Mounting arrangements for releasably attaching optical accessories to spectacle frames are significant structural features of these accessories. The following are exemplary of prior art optical accessories and their associated releasable mounting arrangements: DES 197,305; 716,194; 1,348,713; 2,159,710; 2,580,859; 2,602,372; 2,607,919; 2,696,141; 2,949,609; 2,976,767; 2,981,956; 3,092,838; 3,238,005; 3,345,121; 3,453,042; 3,555,563; 3,604,013; 3,741,634; 3,890,037; 3,944,346; 3,958,867; 3,981,569; 4,012,129; 4,176,921; 4,217,037; 4,253,745; 4,322,138; 4,338,004; 4,402,577; 4,402,578; and 4,405,214.

Known optical accessories exhibit a number of deficiencies in connection with the foregoing enumerated design factors. Moreover, most of them cooperate with specially constructed frames in order to work effectively. Accordingly, they are not easily compatible with many kinds of existing frames commercially sold. Furthermore, these specially constructed spectacles often appear unattractive when the accessories are removed therefrom. Incompatibility with commercial spectacle frames is a major drawback of many known accessories.

SUMMARY OF THE INVENTION

It is an object of the present invention to provide an improved optical accessory for use in combination with a pair of prescription glasses.

In an illustrated embodiment, the prescription glasses include a pair of lenses, a pair of lens frames each mounting one of the lenses, and means for connecting the lens frames together in spaced apart orientation. Inwardly facing portions of the lens frames are provided with a groove along rearwardly facing sides of the frames so that the grooves are in general alignment with respect to each other along a line extending parallel to a plane that includes the optical axes of both lenses.

The illustrated embodiment includes a sunshade device having a pair of sunshades. Means are provided for connecting the pair of sunshades together in spaced apart orientation. Means are provided for releasably attaching the sunshade device to the prescription glasses so that the pair of sunshades are positioned over respective ones of the lenses. The attaching means includes a rearwardly extending substantially planar wire-like member which includes a generally U-shaped central portion and a pair of prongs projecting outwardly in opposite directions from the respective ends of the generally U-shaped central portion. The wire-like member is further configured and arranged to extend over the lens frames with the prongs respectively seated in the grooves of the prescription glasses to urge the sunshades towards respective forwardly facing sides of the lens frames.

Among the other objects of the present invention are, therefore, the provision of an improved sunshade accessory in combination with prescription spectacles in which the accessory is easily attached and detached from the spectacles; the provision of an improved sunshade accessory of the foregoing type which has releasable means that can be easily mounted with respect to conventional spectacle frames; and, the provision of a sunshade accessory having releasable securing means which are simple in construction and economical to manufacture.

Other objects and further scope of applicability of the present invention will become apparent from the detailed description to follow when taken in conjunction with the accompanying drawings in which like parts are designated by like reference numerals.

DETAILED DESCRIPTION

Figure 1:
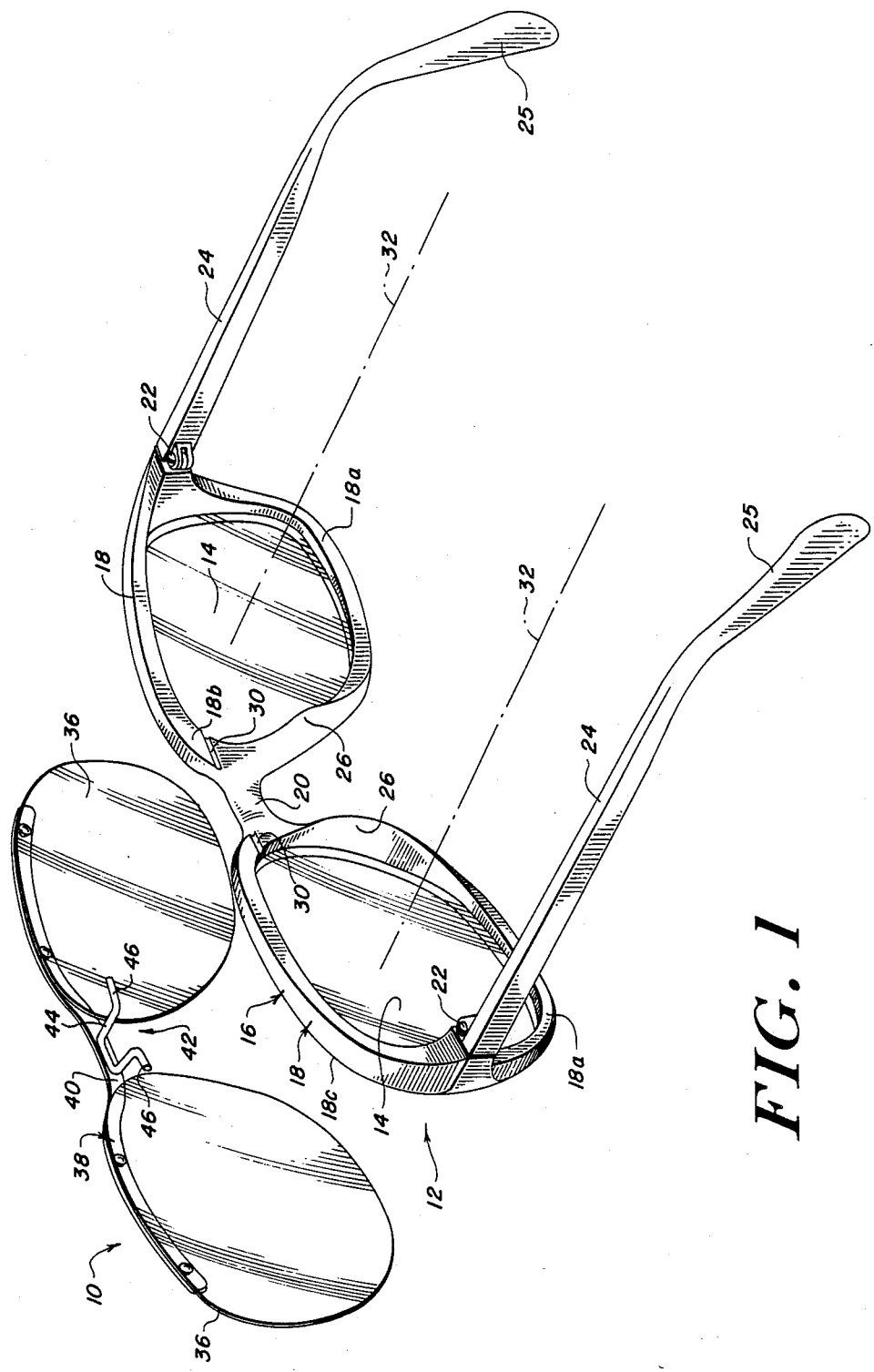
FIG. 1 is an exploded perspective view of an improved optical accessory in combination with a pair of spectacles made in accordance with the present invention.
Figure 2:
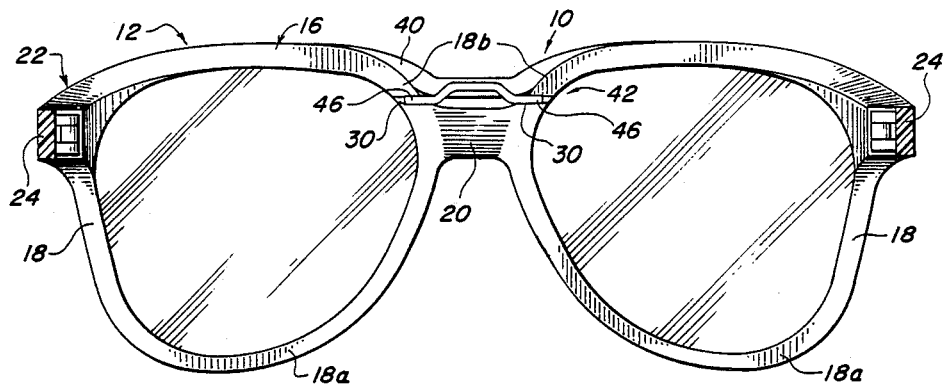
FIG. 2 is a rear elevational view showing the optical accessory and the spectacles joined together.

Reference is now made to the drawings for showing the improved optical accessory 10 of the present invention for use in combination with a pair of spectacles 12 such as of the type shown in FIG. 1. In this embodiment, the optical accessory 10 is a sunshade device.

As illustrated, the spectacles 12 can be of the prescription glasses type and include prescription lenses 14 which are secured to a frame assembly 16.

In this embodiment, the frame assembly 16 is a conventional plastic type including a pair of lens rims or frames 18. The frames 18 are spaced apart from each other and are connected by a solid central bridging member or nose bridge 20. Attached as by temple hinges and lugs, generally indicated at 22, to the outward lateral sides of the frames 18 are conventional temple pieces 24 which have ear tips 25 engageable with the ears of a wearer. Attached to inward lateral sides of the lens frames 18 is a pair of conventional opposing nose pad portions 26.

The frames 18 have rearwardly facing sides 18a, inwardly facing portions 18b and forwardly facing surfaces 18c. Each of the inwardly facing portions 18b is provided with grooves 30. The grooves 30 are in general alignment with respect to each other along a line extending generally parallel to the plane that includes the longitudinal extent of the optical axes 32 of both the lenses 14. The grooves 30 are relatively unobtrusive and can be molded into the inwardly facing portions 18b or cut at some later time. As will be understood, the grooves 30 serve as retaining surfaces which facilitate retaining the prongs of the accessory.

Reference is made to again to the sunshade accesory or device 10. Included in the sunshade device 10 is a pair of spaced apart sunshades 36 which is adapted to protect the eyes from the sun. For connecting the sun shades 36 in spaced apart orientation there is provided a sunshade bridging assembly 38. The bridging assembly 38 is comprised of an integral metal connecting member 40 having its opposite rim end portions riveted to the upper marginal edges of each of the sunshade 36.

Figure 3:
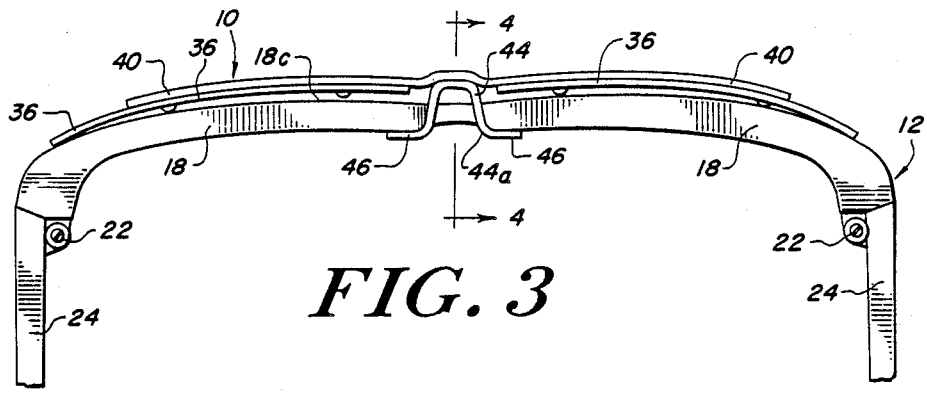
FIG. 3 is a fragmented plan view showing the releasable connection between the accessory and the spectacles; and, FIG. 4 is a cross-sectional view taken along section lines 4—4 appearing in FIG. 3.
Figure 4:
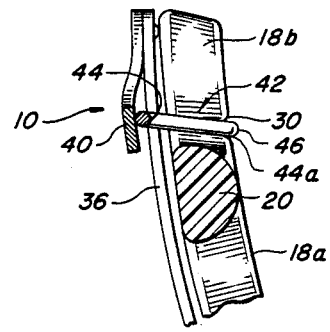

The connecting member 40 is resiliently flexible and has a curvature (FIG. 3) such that when the accessory 10 is mounted to the spectacles 12 the opposite end portions of the sunshades 36 contact the frame 18 in such a manner that the center of the member 40a bows slightly outwardly in a springlike manner. This even more firmly secures the accessory to the spectacle 12. Centrally connected to the connecting member 40 is releasable attaching means 42. The releasable attaching means 42 includes a rearwardly extending substantially planar wire-like member which includes a generally U-shaped central portion 44 and a pair of prongs 46 projecting outwardly in opposite direction from the respective ends 44a of the generally U-shaped central portion 44. The prongs 46 are made of a yieldable and resilient wire-like material which is arranged to effect a resilient snap-fit connection with the frames 18.

When the sunshade accessory 10 is to be mounted on the glasses 12, the U-shaped central portion 44 is to be placed between the frames 18. As this occurs, the prongs 46 ride over the inwardly facing portions 18b. The frames 18 is dimensioned so that the prongs 46 move from their unstressed or unflexed condition to a stressed or flexed condition. When they are retained in the grooves 30 the prongs 46 are resiliently deformed and seek to return to their unstressed condition, thereby creating a resiliently tight or yieldably biased snap-fit engagement with the frames 18.

In such a fashion the sunshades 36 are firmly held in overlying relationship to the lenses 14. Undesired movement along an axis parallel to the optical axes is thus prevented. The U-shaped central portion 44 has its end portion 44a bearing against the opposing surfaces of the frames 18. This inhibits movement of the accessory in directions along the longitudinal extent of the nose bridge. Hence, positional stability of the accessory 10 is simply and economically achieved. This is particularly advantageous with frames of the type having a solid nose bridge. Although a solid nose bridge is shown it will be appreciated that such need not be the case.

To remove the sunshade accessory 10, a user merely has to lift it from the frames 18. The lifting action will be effective to remove the prongs 46 from the grooves 30 due to flexing of such prongs.

Although not shown in the drawings, the present invention envisions that the U-shaped member could be replaced by a pair of posts extending rearwardly with the prongs oriented in the fashion they are presently depicted. Further, although only single prongs cooperate with each lens frame, multiple prongs can be provided. Although grooves are shown it will be appreciated that other retaining structure, preferably integral with the frame, can cooperate with the prongs.

Since certain changes may be made in the above-described accessory and glasses without departing from the scope of the invention herein involved, it is intended that all matter contained in the description or shown in the accompanying drawings shall be interpreted as illustrative and not in a limiting sense.

What is claimed is:

1. The invention comprising:
  prescription glasses including a pair of lenses, a pair of lens frames each mounting one of said lenses and means for connecting said pair of lens frames together in spaced apart orientation, inwardly facing portions of each of said lens frames being respectively provided with a groove along a rearwardly facing side thereof so that said grooves are in general alignment with respect to each other along a line extending parallel to the plane including the longitudinal extent of the optical axes of both said lenses; and
  a sunshade device including a pair of sunshades, means for connecting said pair of sunshades together in spaced apart orientation and means for releasably attaching said sunshade device to said prescription glasses with said pair of sunshades positioned over respective ones of said lenses, said attaching means including a rearwardly extending substantially planar wire-like member including a generally U-shaped central portion and a pair of yieldable and resilient prongs projecting outwardly in opposite directions from the respective ends of said generally U-shaped central portion, said wire-like member further being configured and arranged to extend over said lens frames with said prongs respectively releasably seated in said grooves of said prescription glasses to effect a snap-fit connection with said lens frames and urge said sunshades towards respective forwardly facing sides of said lens frames and to limit lateral movement of said sunshades relative to said glasses.

2. A sunshade device for use with prescription glasses including a pair of lenses, a pair of lens frames each mounting one of the lenses and means for connecting the pair of lens frames together in spaced apart orientation, each inwardly facing portion of the lens frames being respectively provided with a groove along its rearwardly facing side so that both of the grooves are in general alignment with respect to each other along a line extending parallel to the plane that includes the longitudinal extent of the optical axes of both of the lenses, said sunshade device comprising:
  a pair of sunshades;
  means for connecting said pair of sunshades together in spaced apart orientation; and
  means for releasably attaching said sunshade device to the prescription glasses with said pair of sunshades positioned over respective ones of the lenses, said attaching means including a rearwardly extending substantially planar wire-like member which includes a generally U-shaped central portion and a pair of yieldable and resilient prongs projecting outwardly in opposite directions from the respective ends of said generally U-shaped central portion, said wire-like member further being configured and arranged to extend over the lens frames with said prongs respectively releasably seated in the grooves of the prescription glasses to effect a snap-fit connection with said lens frames and urge said sunshades towards respective forwardly facing sides of the lens frames and to limit lateral movement of said sunshades relative to the prescription glasses.

3. The invention of claim 2 wherein said connecting means of said sunshade device includes a resiliently flexible elongated member serving to act in a spring-like manner against the lens frames of the prescription glasses when said sunshade device is operably positioned thereon.

4. The invention of claim 2 wherein the base of said generally U-shaped central portion of said wire-like member is seated against and secured to said connecting means of said sunshade device.

5. A sunshade device for use with prescription glasses including a pair of lenses, a pair of lens frames each mounting one of the lenses and means for connecting the pair of lens frames together in spaced apart orientation, inwardly facing portions of each of the lens frames being respectively provided with a retaining surface along their rearwardly facing side so that the surfaces are in general alignment with respect to each other along a line extending parallel to the plane that includes the longitudinal extent of the optical axes of both of the lenses, said sunshade device comprising:
  a pair of sunshades;
  means for connecting said pair of sunshades together in spaced apart orientation; and
  means for releasably attaching said sunshade device to the prescription glasses with said pair of sunshades positioned over respective ones of the lenses, said attaching means being generally centrally located on said connecting means and including rearwardly extending retaining members having a pair of yieldable and resilient prongs projecting outwardly and in opposite directions from each other said attaching means being configured and arranged to extend over the lens frames so that each of said prongs respectively cooperate with one of said retaining surfaces so as to thereby effect a snap-fit connection with the lens frames and urge said sunshades into a snug engagement with forwardly facing sides of the lens frames and inhibit lateral movement of said sunshade to the frames.

* * * * *